United States Patent
Waas et al.

(10) Patent No.: US 10,031,944 B1
(45) Date of Patent: Jul. 24, 2018

(54) WORK FILE CHANGE DETECTION

(75) Inventors: Florian Michael Waas, San Francisco, CA (US); Joy Jie Kent, Belmont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 878 days.

(21) Appl. No.: 13/173,422

(22) Filed: Jun. 30, 2011

Related U.S. Application Data

(63) Continuation-in-part of application No. 12/983,196, filed on Dec. 31, 2010, now abandoned.

(51) Int. Cl.
*G06F 7/00* (2006.01)
*G06F 17/30* (2006.01)

(52) U.S. Cl.
CPC .... *G06F 17/30477* (2013.01); *G06F 17/3066* (2013.01); *G06F 17/30109* (2013.01); *G06F 17/30938* (2013.01)

(58) Field of Classification Search
CPC ......... G06F 17/30477; G06F 17/30109; G06F 17/30938; G06F 17/3066
See application file for complete search history.

(56) References Cited

U.S. PATENT DOCUMENTS

2001/0042204 A1* 11/2001 Blaker et al. ................ 713/165
2003/0093647 A1*  5/2003 Mogi et al. ...................... 712/1
2005/0240570 A1* 10/2005 Ozbutun ......................... 707/3

* cited by examiner

*Primary Examiner* — Paul Kim
(74) *Attorney, Agent, or Firm* — Barry N. Young

(57) ABSTRACT

A method, article of manufacture, and apparatus for processing information are disclosed. In some embodiments, this includes receiving a query plan, identifying a first work file based on the query plan, determining a first work file transaction ID associated with the first work file, determining a data transaction ID, comparing the first work file transaction ID and the data transaction ID, creating a second work file based on the query plan if the data transaction ID is greater than the first work file transaction ID, and storing the second work file in a storage device. In some embodiments, the second work file may be associated with a second work file transaction ID.

19 Claims, 4 Drawing Sheets

WORK FILE CHANGE DETECTION

CROSS-REFERENCE TO RELATED APPLICATIONS

This application is a continuation in part of and claims priority to co-pending U.S. patent application Ser. No. 12/983,196 for WORK FILE RECYCLING filed on Dec. 31, 2010, which is incorporated herein by reference for all purposes. This application is related to co-pending U.S. patent application Ser. No. 12/983,201, for AUGMENTED QUERY PROCESSING filed on Dec. 31, 2010, which is incorporated herein by reference for all purposes.

FIELD OF THE INVENTION

The present invention relates generally to information storage systems, and more particularly, to systems and methods of processing information.

BACKGROUND OF THE INVENTION

A modern database may contain large amounts of data, and typically, a user does not need know all of the information contained in the database. In fact, most of the data in the database may be irrelevant to the user. In order to find relevant information, a user may query, or search, a database.

Searching databases, especially large databases, may be resource intensive, time consuming, or both. This problem is exacerbated if a database is asked to process identical queries from multiple users or clients.

There is a need, therefore, for an improved method, article of manufacture, and apparatus for processing information.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
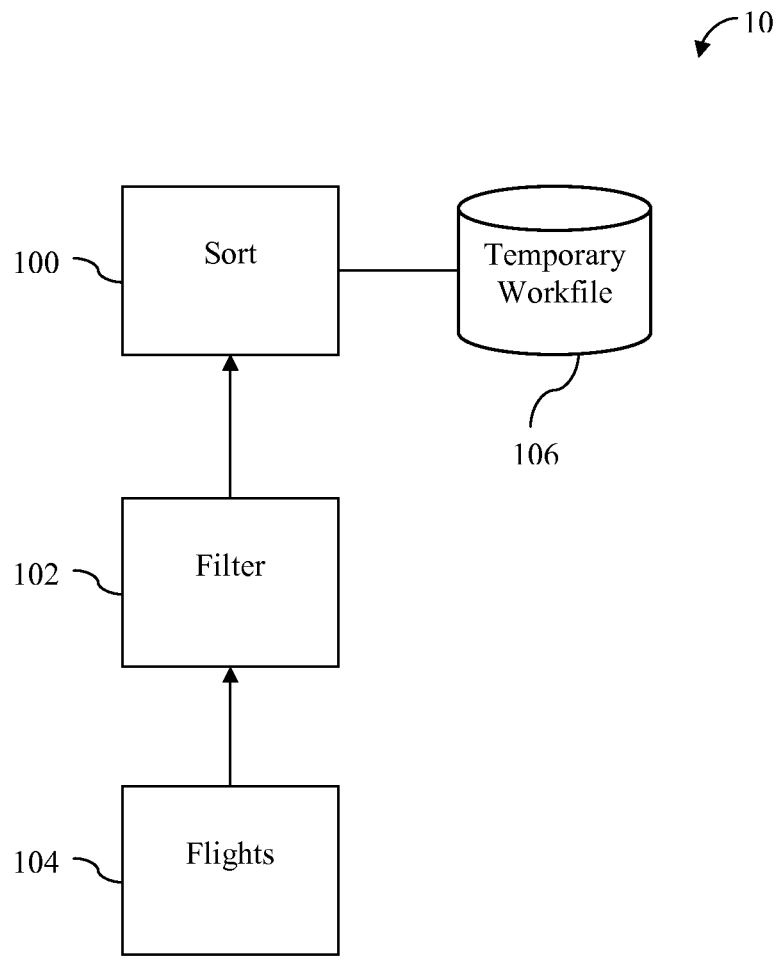
FIG. 1 is a diagram of sample query plan.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to data storage systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Disclosed herein are a method and system to efficiently process information. Conventional database systems, or databases, typically transform a query into a series of operators. Typically, a query processor is a component in the database system that processes queries. These operators may include filter, hash join, aggregate, materialize, and sort among others. When performing these operations, conventional databases typically use up memory and need to create temporary work files, or spillover files. The conventional database may run out of memory due to physical restraints (e.g. there physically is no more memory to process the query), or administrative restraints (e.g. an administrator has allocated a certain amount of memory for the query).

For example, suppose a travel agency website has a database of flights. The database may have one million rows of flight information. When a user searches for a desired flight, the one million rows of flights are filtered according to the criteria set by the user (e.g. starting point, destination, number of transfers, date, time, etc.). Depending on the results of the filter, in some embodiments, a substantial number of rows may still remain, and the database's memory may not be sufficient to handle the query without spilling over the filter results into storage (e.g. creating a temporary work file). The filtered results may then be sorted to another criteria set by the user (e.g. price, number of transfers, etc.) Again, the sort operation may have a substantial number of rows, and memory may not be sufficient to handle the query. Further, depending on the size of the database and the operation performed, the temporary work files may be large and require substantial resources to create. After the query has been processed and the desired flight is located, the temporary work files are deleted. If another user searched for the same desired flight, the whole process of creating the same temporary work files would be repeated.

Further, in some embodiments, every operator may produce a work file, or materialize its intermediate result, regardless of the amount of memory. For example, a filter operator may create a work file with the filtered data, even if the filtered data only takes up 1 MB. The sort operator may also create its own work file with the sorted data. In some embodiments, work files are only created as a part of an execution of an operator. For example, unlike FILTER, SORT needs to inspect all rows before producing the first row (the last input row could be the one that sorts to the top). As part of the inspection, SORT has to write out data and re-read it, potentially several times. The enhances techniques described herein are applicable to situations in which work files are generated as part of an execution, or work files are generated after each operator and materialized.

FIG. 1 illustrates a sample query plan. Query Plan 10 contains a Flights database 104, a Filter operator 102, a Sort operator 100, and a Temporary Work File 106. Flights database 104 contains one million rows of flight information. Filter operator 102 filters the rows of Flights database 104 according to a criterion set by a user, and Sort operator 100 sorts the rows of the filtered rows according to a criteria set by a user. Temporary Work File 106 is used to materialize the results to a user.

In some embodiments, the temporary work files are saved for use in future queries, along with a fingerprint associated with the temporary work files. Using the example above, suppose the user was interested in all flights arriving in LAX, and that there were 30,000 flights that were arriving in LAX. The resulting temporary work file for the filter operation DESTINATION="LAX" would be the unsorted 30,000 flights. In some embodiments, the fingerprint that describes the resulting temporary work file may be FILTER "LAX"=DESTINATION, and associated with the resulting temporary work file.

In some embodiments, a temporary work file may be associated with a fingerprint in an index, or a table. The index, or table, may be stored in memory or may be stored in a non-volatile storage device.

The filtered results may then be sorted according to price. The next resulting temporary work file for the sort operation would be the sorted 30,000 flights. In some embodiments, the fingerprint that describes the next resulting temporary work file may be SORT BY PRICE (FILTER "LAX"=DESTINATION), and associated with the resulting temporary work file.

With the temporary work files and their respective fingerprints saved, subsequent queries can be processed in a more efficient manner. For example, suppose a subsequent user also wanted to search for all flights arriving in LAX and wanted to sort by price. Using conventional techniques, the query would be processed with no regard to previous queries—all one million flights would be located, 30,000 flights would be filtered from the million flights, and the 30,000 filtered flights would be sorted. However, using the enhanced techniques described herein, the two operations can be skipped. When the database receives the subsequent user's query, a fingerprint will be generated based on the subsequent query. In this case, it would compute the possible fingerprints of filtering for LAX, and sorting by price. The fingerprints would then be compared to the saved fingerprints by looking up an index to find any matches. Since a previous user had an identical query, a fingerprint match would be found for both operations. The temporary work file associated with the matched fingerprint would be re-used to present the query results to the subsequent user. Thus, the subsequent query did not have to locate one million flights, filter 30,000 flights from the one million flights, and sort the 30,000 filtered flights. Rather, the subsequent query re-used the previous query's temporary work file to present the query results to the subsequent user, resulting in substantial performance benefits.

In some embodiments, it may be preferable to hash the query plan. The hash may be generated through a variety of methods, and may be compared to a hash of a previous query. Identical queries can reuse work files, and an efficient way to determine if two queries are identical is by comparing the hashes of each query. In some embodiments, a query plan may be reduced to a string of text, and the resulting string of text may be hashed. The resulting hash may be used as the fingerprint for the query. This allows for a quick comparison since hashes are relatively small in size. Thus, the hash may be stored in a table (or hash table) and associated with the query's temporary work files. The table and the associated temporary work files may be stored in a non-volatile storage device, or the table may be stored in memory while the temporary work files are stored in a non-volatile device. The following is a sample hash table:

| Hash | Temporary Work File |
| --- | --- |
| 3F2A | Work File 1 |
| 9876 | Work File 2 |

When a subsequent query is received, its hash may be computed. If the subsequent query's hash matches a hash found in the hash table, it may be preferable, or even mandatory in some cases, to employ additional steps to verify that the two queries are actually identical (this may be due to hash collisions). In some embodiments, this may involve walking through the two query plans to make sure they are identical. If the two query plans are identical, then the work files may be reused. Using hashes, identical matches can be identified in an efficient manner. Instead of walking through two query plans every time, which may be a resource intensive task, the plans are only walked through if their hashes match.

Figure 2:
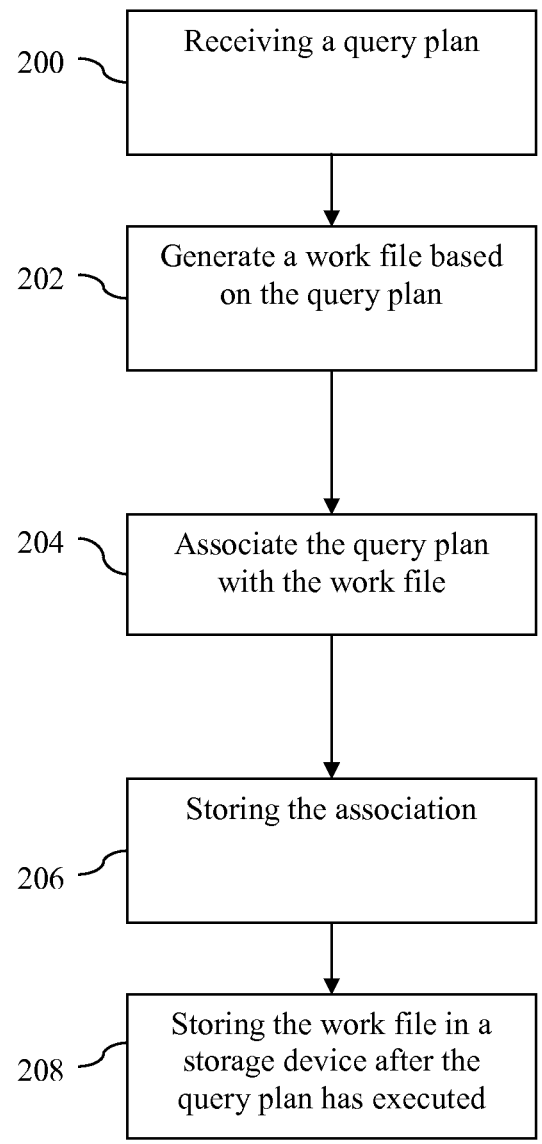
FIG. 2 illustrates a method to process information in accordance with some embodiments.

FIG. 2 illustrates a method to process information in accordance with some embodiments. In step 200, a query plan is received. In step 202, a work file based on the query plan is generated. In step 204, the query plan is associated with the work file. In step 206, the association is stored. In step 208, the work file is stored in a storage device after the query plan has executed. The storage device may be the same storage device in which the work file was created (e.g. the work file is not deleted after the query plan has executed).

Figure 3:
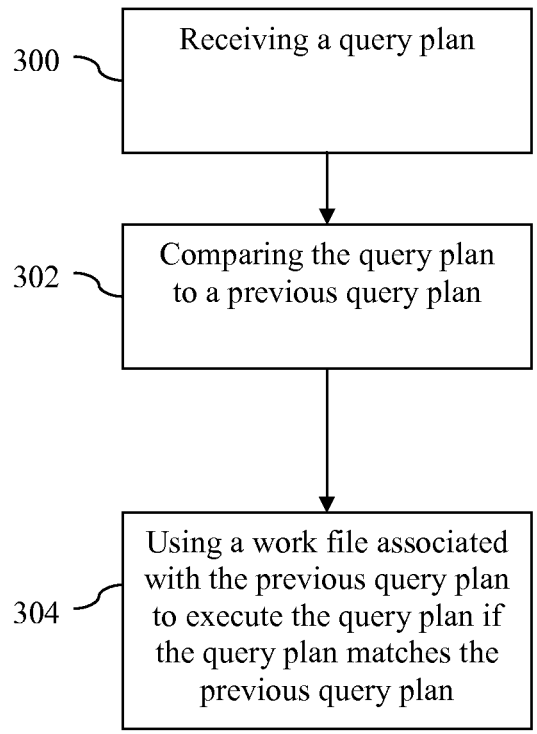
FIG. 3 illustrates a method to process information in accordance with some embodiments.

FIG. 3 illustrates a method to process information in accordance with some embodiments. In step 300, a query plan is received. In step 302, the query plan is compared to a previous query plan. In step 304, a work file associated with the previous query plan is used to execute It should be noted that if a subsequent query does not match any fingerprint in the index, there is no substantial performance difference as compared to conventional databases. Comparing fingerprints (e.g. hashes, etc.) requires little system resources compared to processing a query plan and generating temporary work files. Thus, in a best case scenario, the enhanced techniques described herein may be used to skip all operators during a query execution, and in the worse case scenario, all the operators are processed as a conventional database would do.

In some embodiments, it may be preferable to delete some of the temporary work files. For example, work files that are out of date due to a change in the database may be deleted. In addition, work files may require considerable storage space, and it may not be feasible to keep every work file indefinitely. Standard cache eviction policies, such as Least Recently Used (LRU), may be used to determine which work files to delete, and when to delete them. Further, it may be preferable to delete the temporary work files and the index upon reboot of the database.

Creation of work files may also be influenced by things external to the query executor. For example, policies may dictate that work file generation should be skipped for queries that are unlikely to generate re-usable intermediate results. Cost estimates may also be used to influence cache eviction policy and work file generation.

In some embodiments, deleting temporary work files may be based on policy. For example, a policy may dictate that all work files over 1 GB be deleted if the work file has not been utilized ten times in the previous day. In another example, suppose Work File A is 100 kb and is re-used 100 times, while Work File B is 3 MB and is reused 10 times. Since Work File B may take a considerably larger amount of resources to create than Work File A, it may be preferable to retain Work File B even if its utilization rate is less than Work File A.

Some databases may have dynamic data, and may be updated or modified. When the underlying data in a database changes, a work file may not be re-usable even if subsequent queries exactly match the query that produced the work file. For example, suppose a query for "all flights from LAX returned 10 flights." After the query was processed and its associated work file created, suppose LAX added a new terminal and added 5 departure flights. If a subsequent query for "all flights from LAX" used the work file, the result would be out-dated information (e.g. 10 flights instead of 15 flights). In some embodiments, it may be preferable to track the changes that occur in a database.

In some embodiments, it may be preferable to associate a Transaction ID with a transaction. For example, a flight database may be:

| Row | From | To | Flight Date | Transaction ID |
|---|---|---|---|---|
| 1 | SFO | JFK | Jun. 29, 2011 | 1 |
| 2 | SFO | LAX | Jun. 29, 2011 | 2 |
| 3 | SFO | OAK | Jun. 29, 2011 | 3 |
| 4 | LAX | JFK | Jun. 29, 2011 | 4 |

As shown above, Row 1 was modified by a transaction with a Transaction ID of 1 to show a flight from SFO to JFK with a flight date of Jun, 29, 2011. Similarly, Row 2 was modified by a transaction with a Transaction ID of 2 to show a flight from SFO to LAX with a flight date of Jun. 29, 2011, and so on. Typically, the greater the Transaction ID, the later the transaction occurred. Using the above table, Row 2 was modified after Row 1 was modified since Transaction ID 2 is greater than Transaction ID 1.

In some embodiments, the Transaction IDs of the database may be stored in an array in shared memory. The array may be fixed length in some embodiments.

Following the example illustrated by the table, suppose a query asked for a "group by departure." In some embodiments, the query may be assigned a Transaction ID, and in this case assigned Transaction ID 5. The query would create a work file, and produce a result of "SFO, 3" and "LAX, 1" (3 flights from SFO, and 1 flight from LAX). As discussed herein, the query and work file may be associated together. For example, a fingerprint or hash may be generated for the query, and be associated with the work file by way of table or index. In addition to the fingerprint, the Transaction ID of the query may also be associated with the work file. For example, since this query was assigned a Transaction ID 5, its work file may be associated with Transaction ID 5. A hash table may look like the following in some embodiments:

| Hash | Temporary Work File | Transaction ID |
|---|---|---|
| 3F2A | Work File 1 | 5 |

Now suppose a subsequent query, with Transaction ID 6, also asked for a "group by departure." As discussed herein, a hash may be generated based on the subsequent query, and compared against other hashes. Since the subsequent query is identical to the initial query, their hashes will match and a work file will be identified. To determine whether the work file is re-usable (e.g. up to date), the transaction ID of the work file may be compared against the transaction ID of the latest update to the database (e.g. the highest transaction ID in the database). In this case, the work file's transaction ID (5) is greater than the database's highest transaction ID (4). Since the work file's transaction ID is greater than or equal to the database's highest transaction ID, the work file may be reused. In other words, the underlying data in the database hasn't changed since the work file was created.

Now suppose the flight from SFO to LAX with a flight date of June 29 was canceled, and the database administrator updated the flight to be from LAX to SFO with a flight date of Jun. 30, 2011. The following table illustrates the change:

| Row | From | To | Flight Date | Transaction ID |
|---|---|---|---|---|
| 1 | SFO | JFK | Jun. 29, 2011 | 1 |
| 2 | LAX | SFO | Jun. 30, 2011 | 7 |
| 3 | SFO | OAK | Jun. 29, 2011 | 3 |
| 4 | LAX | JFK | Jun. 29, 2011 | 4 |

In other words, Row 2 of the database has been modified, and that transaction was assigned Transaction ID 7.

Now suppose a user entered a new query "group flights by departure," which is assigned Transaction ID 8. As discussed herein, a hash may be generated for the new query, and the new query's hash may be compared against other hashes. Since the new query is identical to the initial query, their hashes will match and a work file will be identified. Similarly, the work file's transaction ID will be compared against the transaction IDs of the database. In this case, the work file's transaction ID is 5, while the database's last transaction ID is 7. Since the work file's transaction ID is less than the database's last transaction ID, the work file may not be reused. In other words, the underlying data in the database changed after the work file was created. Thus, the new query would have to process the query from scratch (e.g. can't re-use work files). In some embodiments, the new query will create new work files associated with its Transaction ID. These new work files may be stored in addition to the old work files, or may replace the old work files.

Typical databases may have thousands of transaction IDs, and several algorithms may be used to search for the latest database transaction ID. For example, in some embodiments, a binary search algorithm may be used.

Similarly, in some embodiments, the changes in Materialized View may also be tracked with transaction IDs. Using the example above, a materialized view table may look like the following:

| Count | Depart | @ Transaction ID |
|-------|--------|------------------|
| 3     | SFO    | @ Transaction ID 5 |
| 1     | LAX    |                  |
| 2     | SFO    | @ Transaction ID 8 |
| 2     | LAX    |                  |

As illustrated by the above materialized view table for query "group by departure," at Transaction ID 5, there was a count of "3" for flights from "SFO," and there was a count of "1" for flights from "LAX." This is the result of the query "group by departure" before Row 2 was modified. Similarly, a materialized view for Transaction ID 7 shows that there was a count of "2" for flights from "SFO," and a count of "2" for flights from "LAX." This is the result of the query "group by departure" after Row 2 was modified.

Figure 4:
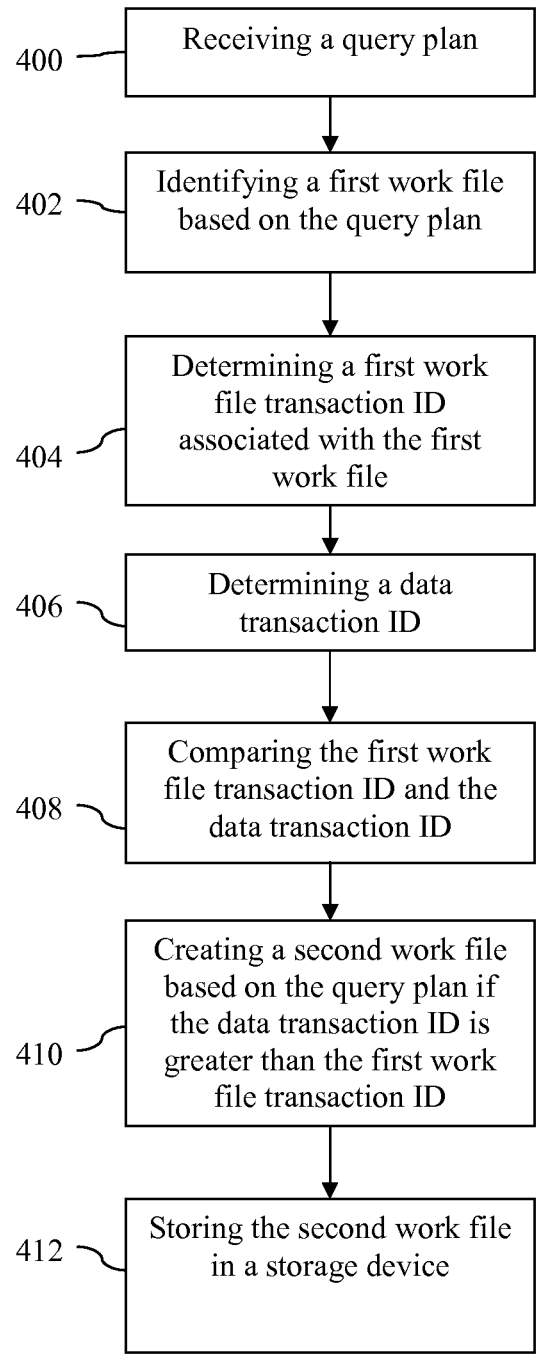
FIG. 4 illustrates a method to process information in accordance with some embodiments

FIG. 4 illustrates a method to process information in accordance with some embodiments. In step 400, a query plan is received. In step 402, a first work file is identified based on the query plan. In step 404, a first work file transaction ID associated with the first work file is determined. In step 406, a data transaction ID is determined. In step 408, the first work file transaction ID and the data transaction ID are compared. In step 410, a second work file is created based on the query plan if the data transaction ID is greater than the first work file transaction ID. In step 412, the second work file is stored in a storage device. In some embodiments, a second work file transaction ID may be associated with the second work file.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A computer implemented method for processing data in a database, comprising:
assigning a new transaction ID to the database for each transaction that modifies data content of the database;
receiving a current query plan;
generating a fingerprint corresponding to said current query plan;
identifying a first work file produced by a previous query plan having another fingerprint that is the same as said fingerprint of said current query plan;
determining a first work file transaction ID associated with the first work file, the first work file transaction ID designating a first data content of said database processed by the previous query plan to produce the first work file;
determining a current data transaction ID that designates the current data content of said database for the current query plan;
determining whether the current data content of said database is the same or different from the first data content of said database by comparing the first work file transaction ID with the current data transaction ID; and
creating a second work file based on the current query plan upon determining that the current data content is different from the first data content, otherwise reusing the first work file with said current query plan upon determining that the current data content is the same as said first data content.

2. The method as recited in claim 1, wherein said generating a fingerprint for the current query plan comprises generating a hash of the current query plan.

3. The method as recited in claim 2, wherein identifying the first work file includes comparing the hash of the current query plan with a hash of the first query plan associated with the first work file.

4. The method as recited in claim 1 further comprising storing said second work file in a storage device associated with the fingerprint of said current query plan and associated with a second data transaction ID, the second data transaction ID representing another data content of the database associated with the second work file.

5. The method as recited in claim 1, further comprising associating a second work file transaction ID with the second work file.

6. A system for processing data in a database, comprising a storage device and a processor configured to:
   assign a new transaction ID to the database for each transaction that modifies data content of the database;
   receive a current query plan;
   generate a fingerprint corresponding to said current query plan;
   identify a first work file produced by a previous query plan having another fingerprint that is the same as said fingerprint of said current query plan;
   determine a first work file transaction ID associated with the first work file, the first work file transaction ID designating a first data content of said database processed by the previous query plan to produce the first work file;
   determine a current data transaction ID that designates the current data content of said database for the current query plan;
   determine whether the current data content is the same or different from the first data content by comparing the first work file transaction ID with the current data transaction ID; and
   create a second work file based on the current query plan upon determining that the current data content is different from the first data content, otherwise reuse the first work file with said current query plan upon determining that the current data content is the same as said first data content.

7. The system as recited in claim 6, wherein the processor is further configured to generate the fingerprint for the current query plan by generating a hash of the current query plan and to associate the hash with the data transaction ID.

8. The system as recited in claim 7, wherein to identify the first work file includes to compare the hash of the current query plan with a hash of the first query plan associated with the first work file.

9. The system as recited in claim 6, wherein the processor is configured to store said second work file in a storage device associated with the fingerprint of said current query plan and associated with a second data transaction ID, the second data transaction ID representing another data content of the database associated with the second work file.

10. The system as recited in claim 7, wherein the processor is further configured to associate a second work file transaction ID with the second work file.

11. A computer program product for processing data in a database, comprising a computer readable non-transitory storage medium having program instructions embodied therein for:
    assigning a new transaction ID to the database for each transaction that modifies data content of the database;
    receiving a current query plan;
    generating a fingerprint corresponding to said current query plan;
    identifying a first work file produced by a previous query plan having another fingerprint that is the same as said fingerprint of said current query plan;
    determining a first work file transaction ID associated with the first work file, the first work file transaction ID designating a first data content of said database processed by the previous query plan to produce the first work file;
    determining a current data transaction ID that designates the current data content of said database for the current query plan;
    determining whether the current data content is the same or different from the first data content by comparing the first work file transaction ID with the current data transaction ID; and
    creating a second work file based on the current query plan upon determining that the current data content is different from the first data content, otherwise reusing the first work file with said current query plan upon determining that the current data content is the same as said first data content.

12. The computer program product as recited in claim 11, wherein said generating the fingerprint for the current query plan comprises generating a hash of the current query plan.

13. The computer program product as recited in claim 12, wherein identifying the first work file includes comparing the hash of the current query plan with a hash of the first query plan associated with the first work file transaction ID.

14. The computer program product as recited in claim 11, further comprising storing said second work file in a storage device associated with the fingerprint of said current query plan, and associated with a second data transaction ID, the second data transaction ID representing another state of the data associated with the second work file.

15. The computer program product as recited in claim 11, further comprising machine readable code for associating a second work file transaction ID with the second work file.

16. The method of claim 1, wherein said assigning a new transaction ID comprises assigning a sequentially numbered transaction ID to each sequential modification of the data content.

17. The method of claim 16, wherein said determining whether the current data content is the same or different comprises determining whether the current data transaction ID is the same as or greater than the first work file transaction ID.

18. The system of claim 6, wherein said processor assigns a sequentially numbered transaction ID to each sequential modification of the data content of the database, and determines whether the current data content is the same or different by determining whether the current data transaction ID is the same as or greater than the first work file transaction ID.

19. The computer program product as recited in claim 11, wherein said assigning a new transaction ID comprises assigning a sequentially numbered transaction ID to each sequential modification of the data content, and said determining whether the current data content is the same or different comprises determining whether the current data transaction ID is the same as or greater than the first work file transaction ID.

* * * * *